Figure 1:
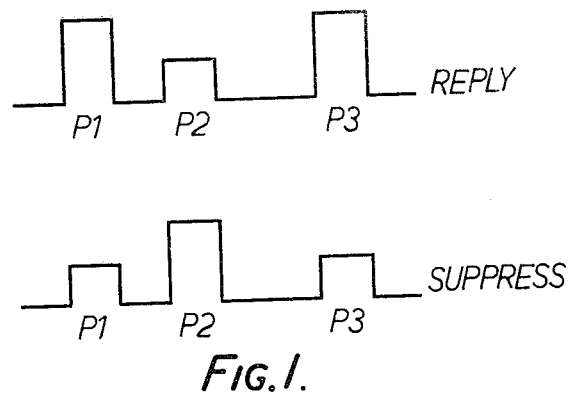

United States Patent [19]
Cole

[11] 4,316,190
[45] Feb. 16, 1982

[54] SECONDARY SURVEILLANCE RADAR

[75] Inventor: Henry W. Cole, Billericay, England

[73] Assignee: The Marconi Company Limited, Chelmsford, England

[21] Appl. No.: 153,940

[22] Filed: May 28, 1980

[30] Foreign Application Priority Data

Jun. 5, 1979 [GB] United Kingdom ............... 19502/79

[51] Int. Cl.³ .............................................. G01S 13/78
[52] U.S. Cl. ........................... 343/6.5 R; 343/100 LE
[58] Field of Search ...................... 343/6.5 R, 100 LE

[56] References Cited

U.S. PATENT DOCUMENTS

| | | | |
|---|---|---|---|
| 3,213,446 | 10/1965 | Voyner | 343/6.5 R |
| 3,427,621 | 2/1969 | Brunner | 343/6.5 R X |
| 3,643,256 | 2/1972 | Owen | 343/6.5 R |
| 4,100,544 | 7/1978 | Keeran | 343/6.5 R |
| 4,137,531 | 1/1979 | Pell | 343/6.5 R |

FOREIGN PATENT DOCUMENTS

| | | |
|---|---|---|
| 1803390 | 5/1970 | Fed. Rep. of Germany ... 343/6.5 R |
| 918315 | 2/1963 | United Kingdom . |
| 1014388 | 12/1965 | United Kingdom . |
| 1056352 | 1/1967 | United Kingdom . |
| 1074474 | 7/1967 | United Kingdom . |
| 1316562 | 5/1973 | United Kingdom . |
| 1515666 | 6/1978 | United Kingdom . |

Primary Examiner—T. H. Tubbesing
Attorney, Agent, or Firm—Spencer & Kaye

[57] ABSTRACT

A secondary surveillance radar is provided with means for reducing the effect of undesirable reflections on the interrogation pulses transmitted by the radar and the replies received in response to the interrogations. In addition to a directional antenna a further omni-directional antenna is provided and the energy of certain of the interrogation pulses are shared between the two antennas in such a manner as to enhance suppression of replies from aircraft which are located at angles away from the boresight of the directional antenna.

10 Claims, 4 Drawing Figures

SECONDARY SURVEILLANCE RADAR

This invention relates to secondary surveillance radar (SSR) in which pulses transmitted by a base radar station are used to interrogate a target which in turn sends a reply to the base station if it is able and willing to respond to the interrogation pulses. Radar systems of this kind are also sometimes referred to as radar beacon systems (RBS) and they are usually used by base stations on the ground to monitor the movement of aircraft in the vicinity of an airport. The transmitted interrogation pulses trigger the operation of an automatic responder carried by the aircraft which intercept the pulses. When a reply is received at the ground station the range of the aircraft can be deduced from the delay occurring between the transmission of the interrogation pulse and the receipt of the reply. The direction of the aircraft relative to the ground station corresponds to the direction of the radar boresight when the interrogation pulses are transmitted. The boresight continually rotates in azimuth and in order to improve the directional nature of the interrogation, the interrogation pulses consist of a sequence of at least three separate pulses designated P1, P2 and P3 by international convention and it is arranged that the magnitudes of pulses P1 and P3 exceed that of pulse P2 only in the direction of the radar boresight. The transponders carried by aircraft are arranged to respond to the interrogation pulse only when this condition is satisfied, and to suppress any reply when the pulse P2 is of greater magnitude than pulses P1 and P3. Thus when a reply is received by the ground station, the direction of the responding aircraft can be determined.

The operation of a secondary surveillance radar can be seriously affected by reflections of interrogation pulses and/or the reply pulse by large objects such as aircraft hangers and other buildings close to the radar transmitter. In some circumstances this can adversely affect the reliability and integrity of the information provided by a secondary surveillance radar and the present invention seeks to reduce this difficulty.

According to the invention, a secondary surveillance radar includes an antenna arrangement consisting of an omni-directional antenna and a directional antenna capable of being operated in sum and difference modes; means for routing a sequence of pulses to the antenna arrangement, for transmitting the first pulse of the sequence via the directional antenna as a sum pattern and via the omni-directional antenna, for transmitting the second pulse via the omni-directional antenna and via the directional antenna as a difference pattern, and for transmitting the third pulse of the sequence via the directional antenna as a sum pattern.

The three pulses of the sequence correspond to the pulses generally designated P1, P2 and P3 respectively.

The directional antenna may be a conventional antenna having a linear array of individual radiating elements, a sum radiating pattern being produced by transmitting energy in phase from all elements and a difference pattern being produced by introducing a phase shift between the energy radiated by half the number of individual elements on one end of the array, and the remaining elements at the other end.

The omni-directional antenna may be an antenna having a radiation pattern which is completely circularly symmetrical, but preferably it has a radiation pattern which is least in the direction of the boresight of the directional antenna. Even in this latter case, it may still be regarded as an omni-directional antenna, since its radiation pattern does not become insignificant or approach zero in any direction and in particular its radiation pattern does not contain pronounced sidelobes of the kind usually associated with directional antennas possessing a number of individual radiating elements.

Preferably a coupling arrangement is provided to split the power of the first and second pulses of the sequence of pulses between the directional antenna and the omni-directional antenna.

Preferably the coupling arrangement is provided with means for varying the degree of coupling. In this way, the proportion of power fed to the omni-directional antenna can be adjusted.

Preferably again the coupling arrangement includes a pair of directional 3 dB couplers connected in series, with adjustable phase shifting means being provided between one of the output ports of one of said couplers, and an input port of the other of said couplers. The proportion of power fed to the omni-directional antenna is adjusted by varying the phase of the adjustable phase shifting means.

When the radar is operating in its receive mode so as to receive the replies transmitted by the transponders carried by aircraft which intercept the interrogation pulses, the directional array is arranged to operate with its sensitivity arranged as a sum pattern. In this case preferably the reply is arranged to by-pass the directional coupling arrangement. The directional coupling arrangement would attenuate the signal level of the reply pulses and this would be most undesirable, since in some circumstances the reply pulses may be very weak.

Preferably a pair of circulators is provided to couple out the energy of the received reply pulse from the output of the directional antenna and to subsequently couple the energy back into the signal processing path of the radar.

This permits attenuators to be positioned between the two circulators so that the power level of the radiated energy can be reduced if required, but without attenuating the signal level of replies received from interrogated aircraft.

Figure 2:
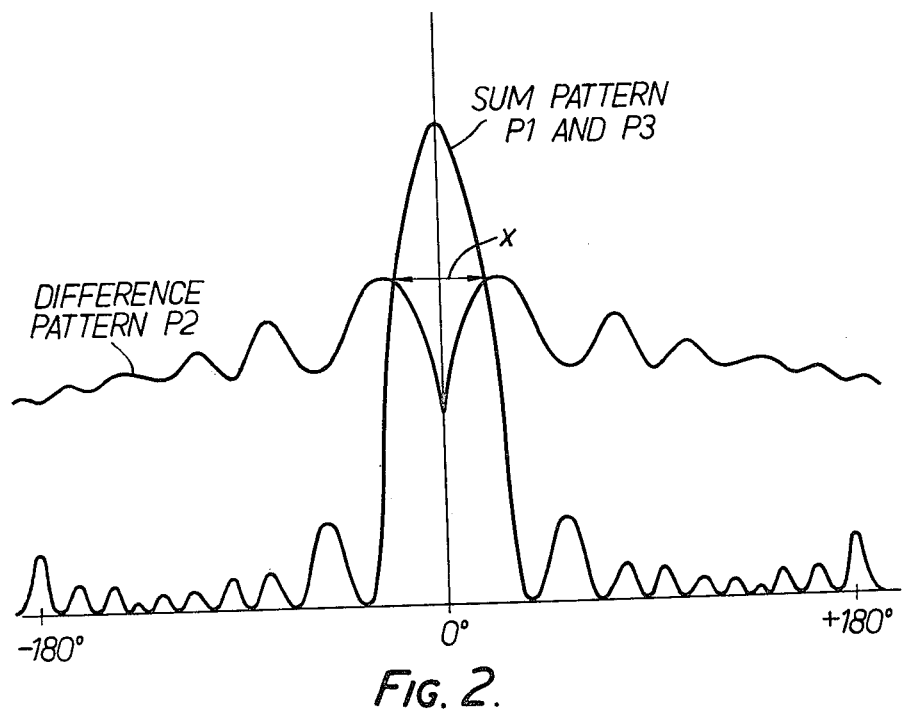
Figure 3:
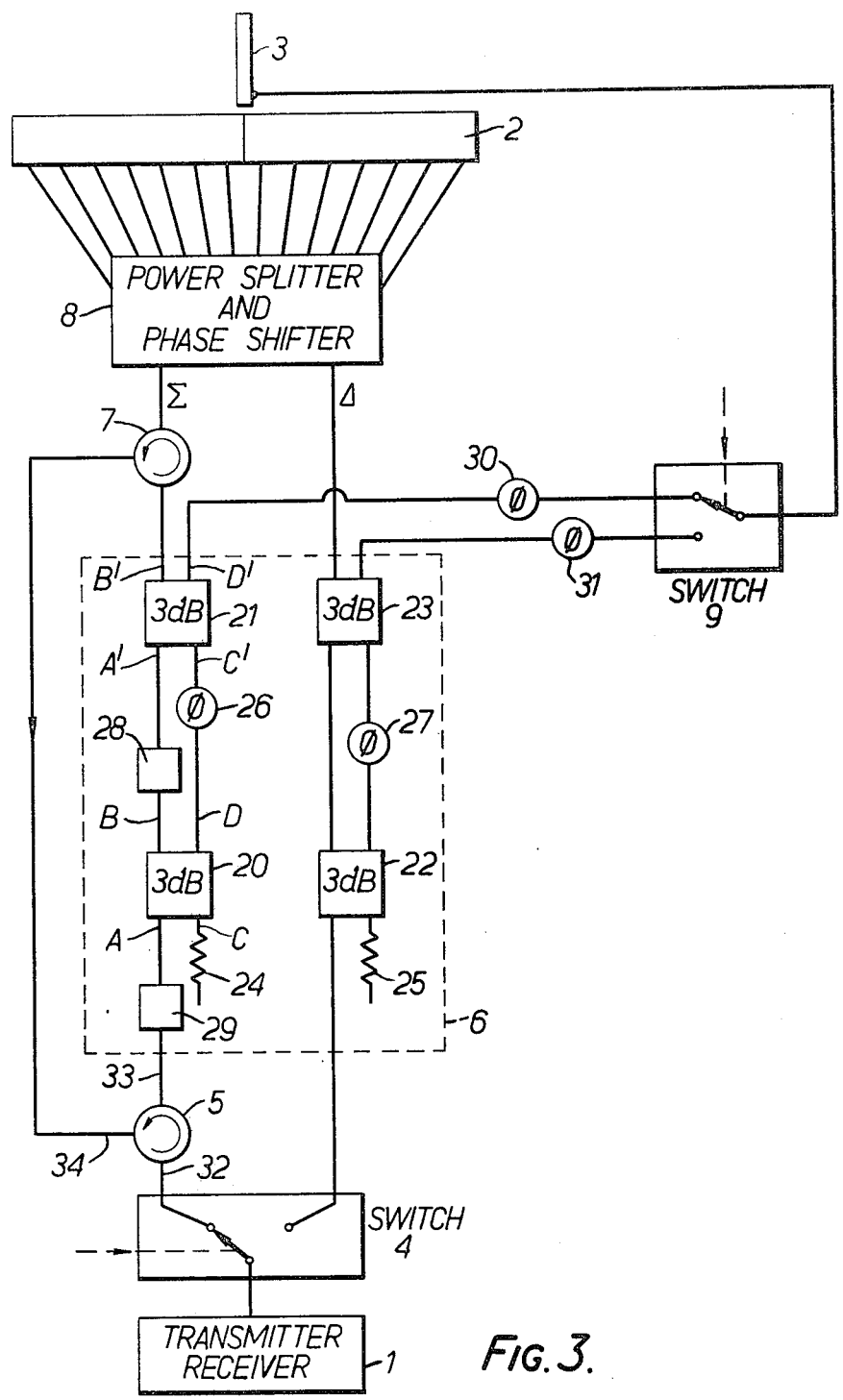
Figure 4:
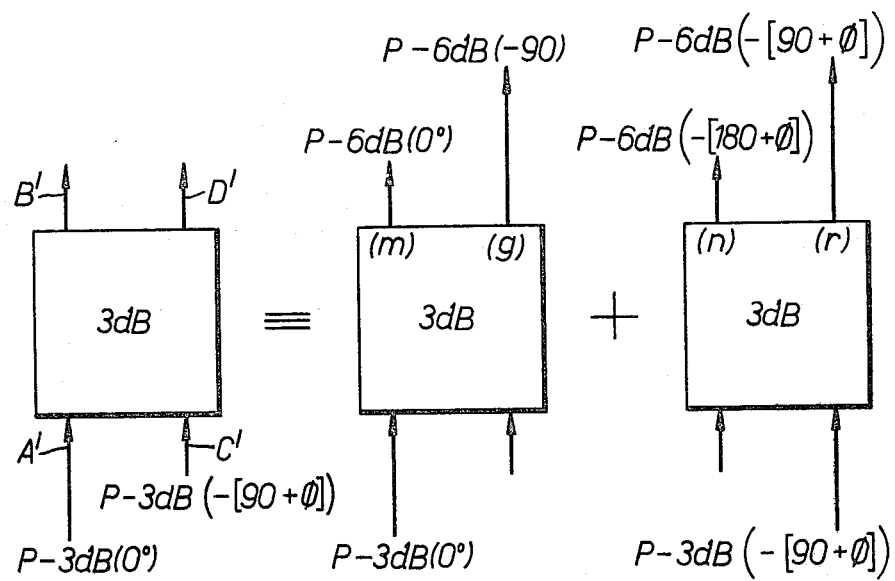

The invention is further described by way of example with reference to the accompanying drawings in which, FIG. 1 illustrates the nature of the interrogation pulses, FIG. 2 illustrates a conventional radiation pattern of a secondary surveillance radar, using sum and difference modes of operation, FIG. 3 illustrates in simplified form part of a secondary surveillance radar in accordance with the present invention, and FIG. 4 is an explanatory diagram.

The radar transmits a sequence of three interrogation pulses termed P1, P2 and P3. These are illustrated in FIG. 1. The time interval between pulses P1 and P3 determines the nature of the interrogation being made, i.e. by choosing the correct spacing, an aircraft can be asked to provide its identity or its altitude, for example. The pulse P2 is used as a control pulse and by convention P2 is spaced apart from P1 by two microseconds. The interrogation pulses P1 and P3 are generally transmitted from an antenna having a radiation pattern which is extremely narrow in azimuth so that only those aircraft lying in a very small angle of azimuth are interrogated. In this way the angular position of aircraft can be determined. However, radiation patterns which are very narrow in azimuth inevitably produce sidelobes which in some cases can be of sufficient signal strength to stimulate replies from aircraft at relatively short range from the radar ground station but which are not in the direction of the radar boresight. For this reason, the control pulse P2 is used and the transponders carried by the aircraft are arranged to reply only if the control pulse P2 is of lower amplitude than the pulses P1 and P3. When the control pulse P2 is of an amplitude greater than that of pulses P1 and P3, the transponder is suppressed and no reply is sent. The way in which this is used to improve the directional nature of the interrogation is illustrated in FIG. 2 and it will be seen that the control pulse P2 is of lower amplitude than pulses P1 and P3 only over the angular range X. By transmitting the pulse P2 as a difference pattern from a directional antenna, a minima is produced on the boresight of the radar and this increases the radiated amplitudes between pulses P2 on the one hand, and pulses P1 and P3 on the other hand.

This system works satisfactorily well under most circumstances, but the operation can be seriously impaired if the interrogation pulses are reflected in directions other than the intended direction of propagation. In particular, the presence of large buildings such as aircraft hangers in the neighbourhood of the radar transmitter can cause the interrogation pulses to be transmitted towards aircraft which are not on the boresight of the radar antenna. Providing that the correct amplitude condition is satisfied a reply can be received from an aircraft under these conditions and it will appear to the ground station that an aircraft has been detected in a direction corresponding to the boresight of the antenna. Even though the amplitude of the interrogation pulses may be significantly attenuated on reflection, they can nevertheless still produce the required amplitude condition of an aircraft located off boresight. In theory, an aircraft located at angular directions off boresight should suppress a reply, since the control pulse P2 will be received over a direct path such that its amplitude should be larger than pulses P1 and P3. However, as can be seen from FIG. 2, the amplitudes of pulses P1 and P3 are designed to be very low at angles away from boresight, and the amplitude of P1 transmitted directly to an aircraft off boresight may be below the threshold of reception of that aircraft. The modified arrangement shown in FIG. 3 enables the range at which suppression can take place to be greatly increased, so that the effect of reflected signals is significantly less serious.

Referring to FIG. 3, a radar transmitter/receiver 1 transmits energy to a directional antenna 2 and an omni-directional antenna 3, so that it is radiated into space as required. The omni-directional antenna 3 is mounted vertically above the directional antenna 2 so that its vertical axis passes through the centre of the directional antenna. The nature of the transmitter/receiver 1 may be as in a conventional secondary surveillance radar and so will not be described in any detail. The sequence of pulses P1, P2 and P3 having equal amplitudes are produced by the transmitter/receiver 1 and applied to a switch 4. The switch 4 has two outputs, one of which is coupled via a circulator device 5 to a coupling arrangement 6 and thence via a further circulator device 7 to a power splitter and phase shifter 8, which fits the directional antenna 2. The other output of the switch 4 is also fed via the coupling arrangement 6 to the power splitter and phase shifter 8. The power splitter and phase shifter 8 and the directional antenna 2 are arranged so that energy fed to them from a circulator 7 is radiated as a sum pattern, represented by the symbol $\Sigma$ and the energy applied to the other input of the power splitter and phase shifter 8 is radiated as a difference pattern represented by the symbol $\Delta$.

The coupling arrangement 6 diverts a portion of the energy applied to it to a further switch 9, which routes the energy to the omni-directional antenna 3. The antenna 3 although termed an omni-directional antenna does not have a radiation pattern which is circularly symmetrical. Instead it has a sensitivity which is less pronounced in the direction of the boresight of the directional antenna. Its directional properties need not be greatly pronounced and it will certainly be less directional than an antenna possessing an array of individual radiating elements. The sum and difference inputs of the power splitters and phase shifter 8 are fed via the switch 4 which in practice, would be a high speed electronic switch which is operated by an appropriate drive waveform so that the pulses P1 and P3 are applied to the sum input $\Sigma$ and the pulse P2 is applied to the difference input $\Delta$. When the switch 4 is in its sum position (i.e. in the position illustrated on FIG. 3), the pulse P1 is primarily applied to the input $\Sigma$ of the power splitter and phase shifter 8, but a portion of its power is also applied to the switch 9. The extra energy of pulse P1 which is radiated by the omni-directional antenna effectively raises the power level of pulse P1 which is radiated in directions off boresight. The degree of increase in power of the pulse P1 in off boresight directions is governed by the coupling factor of the coupling arrangement 6.

After the pulse P1 has been transmitted, the switch 4 is set so as to divert the pulse P2 into the difference input $\Delta$ of the power splitter and phase shifter 8. Again part of the power of this pulse is diverted to the switch 9, which is caused to be set into its alternative position by a suitably timed drive pulse waveform. Thus a portion of the power of pulse P2 is diverted to the omni-directional antenna 3, thereby causing the level of the radiation pattern off boresight to be increased so that it exceeds that of P1 for all directions apart from the small angular region X which is centred on the boresight of the directional antenna 2.

When pulse P2 has been transmitted the switch 4 is reset to its initial postion to allow the third pulse P3 to be routed to the sum input $\Sigma$ of the power splitter and phase shifter 8. However, switch 9 is left in its previous position so that no energy from pulse P3 is applied to the omni-directional antenna 3.

The coupling arrangement 6 consists of two sets of pairs of serially connected directional 3 dB couplers 20, 21, 22 and 23. Each coupler has four ports A, B, C and D, ports A and C being input ports and ports B and D being output ports. The pulse energy is applied to the port A of couplers 20 and 22, and the other input ports C are connected to matched loads 24 and 25. Adjustable phase shifters 26 and 27 are connected between output port D and input port C' of couplers 20 and 21 and couplers 22 and 23 respectively, and attenuators 28 and 29 may be inserted where indicated if required.

The property of each coupler is as follows. If power P(0°) is applied to port A, the output power at port B is P−3 dB(0°), and the output power at port D is P−3 db(−90°), the angle in brackets indicating the relative phase.

The combined effect of a pair of couplers and the intervening phase shifter, which introduces a phase shift $\phi$, is indicated diagrammatically in FIG. 4, and the effective amplitude and phase at output port B' is given by the sum of m and n. Similarly that at output port D' is given by the sum of g and r.

The respective powers are $$P_{B'} = \frac{(1 + \sin \phi')}{2} P_O$$

$$P_{D'} = \frac{(1 - \sin \phi')}{2} P_O$$

where $\phi' = \phi - \pi/2$ for the configurations of 3 dB couplers used in this example.

By varying $\phi'$ the ratio of power appearing at ports B' and D' can be continuously varied from zero to infinity.

The remaining phase shifters 30 and 31 are merely to trim the relative phases of the signals applied to switch 9, so that the phase of the energy radiated by the omni-directional antenna 3 is correctly related to that radiated by the directional antenna 2.

The properties of the circulator devices 5 and 7 are well known, but briefly the transmission properties are, with reference to circulator device 5, as follows. The attenuation of a signal passing from port 32 to port 33, or from port 33 to port 34, or from port 34 to port 32 is very low, and is approximately zero. However attenuation in the other direction, i.e. passing from port 32 to port 34, or from port 34 to port 33, or from port 33 to port 32 is very significant, and is typically of the order of 15 dB.

The use of the circulator devices enables attenuators 28 and/or 29 to be present to control the radiated power level, without attenuating replies received from interrogated aircraft.

I claim:

1. A secondary surveillance radar including an antenna arrangement consisting of an omni-directional antenna and a directional antenna capable of being operated in sum and difference modes; means for routing a sequence of pulses to the antenna arrangement, for transmitting the first pulse of the sequence via the directional antenna as a sum pattern and via the omni-directional antenna, for transmitting the second pulse via the omni-directional antenna and via the directional antenna as a difference pattern, and for transmitting the third pulse of the sequence via the directional antenna as a sum pattern.

2. A radar as claimed in claim 1 and wherein the directional antenna is one having a linear array of individual radiating elements, a sum radiating pattern being produced by transmitting energy in phase from all elements and a difference pattern being produced by introducing a phase shift between the energy radiated by half the number of individual elements on one end of the array, and the remaining elements at the other end.

3. A radar as claimed in claim 1 or 2 and wherein the omni-directional antenna is one having a radiation pattern which is completely circularly symmetrical.

4. A radar as claimed in claim 1 or 2 and wherein the omni-directional antenna is one having a radiation pattern which is weakest in the direction of the boresight of the directional antenna.

5. A radar as claimed in claim 4 and wherein the axis of the omni-directional antenna passes through the centre of the directional antenna.

6. A radar as claimed in claim 1 and wherein a coupling arrangement is provided to split the power of the first and second pulses of the sequence of pulses between the directional antenna and the omni-directional antenna.

7. A radar as claimed in claim 6 and wherein the coupling arrangement is provided with means for varying the degree of coupling.

8. A radar as claimed in claim 7 and wherein the coupling arrangement includes a pair of directional 3 dB couplers connected in series, with adjustable phase shifting means being provided between one of the output ports of one of said couplers, and an input port of the other of said couplers.

9. A radar as claimed in claim 6, and wherein means are provided for causing a reply received by the radar in response to an interrogation to by-pass the coupling arrangement.

10. A radar as claimed in claim 9 and wherein a pair of circulators is provided to couple out the energy of the received reply pulse from the output of the directional antenna and to subsequently couple the energy back into the signal processing path of the radar.

* * * * *